United States Patent
Kim et al.

(10) Patent No.: US 8,148,004 B2
(45) Date of Patent: Apr. 3, 2012

(54) WATER-RESISTANT POUCH TYPE SECONDARY CELL

(75) Inventors: Bo Hyun Kim, Daejeon (KR); Han Ho Lee, Daejeon (KR); Jong Hyun Chae, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/878,506

(22) Filed: Sep. 9, 2010

(65) Prior Publication Data
US 2011/0086259 A1    Apr. 14, 2011

Related U.S. Application Data

(63) Continuation of application No. PCT/KR2010/003230, filed on May 24, 2010.

(30) Foreign Application Priority Data

May 21, 2009   (KR) .................. 10-2009-0044318

(51) Int. Cl.
  *H01M 2/00*   (2006.01)
(52) U.S. Cl. ........................................ 429/163
(58) Field of Classification Search .................. 429/162, 429/163, 176, 177, 180, 185
See application file for complete search history.

(56) References Cited

U.S. PATENT DOCUMENTS

| | | | |
|---|---|---|---|
| 6,632,538 B1 * | 10/2003 | Yamazaki et al. | 428/461 |
| 6,838,209 B2 * | 1/2005 | Langan et al. | 429/178 |
| 2008/0292950 A1 * | 11/2008 | Maeda et al. | 429/120 |
| 2009/0023062 A1 | 1/2009 | Kim | |
| 2009/0075168 A1 | 3/2009 | Lee | |

FOREIGN PATENT DOCUMENTS

| | | | |
|---|---|---|---|
| JP | 2000-223090 A | | 8/2000 |
| JP | 2004-55154 A | | 2/2004 |
| JP | 2004-087239 | * | 3/2004 |
| JP | 2009-26739 A | | 2/2009 |
| KR | 10-2009-0076281 A | | 7/2009 |
| KR | 10-0917736 B1 | | 9/2009 |

OTHER PUBLICATIONS

KIPO International Search Report, Appl. No. PCT/KR2010/003230; Jan. 24, 2011 (w/ English translation).
KR Office Action, Appl. No. 10-2010-0047947; Jul. 29, 2011.

* cited by examiner

*Primary Examiner* — Jerry Lorengo
*Assistant Examiner* — Carlos Barcena
(74) *Attorney, Agent, or Firm* — Birch, Stewart, Kolasch & Birch, LLP

(57) ABSTRACT

The present invention relates to a pouch type secondary cell with high water-resistance. The pouch type secondary cell comprises a positive electrode, a separation layer, and a negative electrode. Here, the sealing unit of the secondary cell includes steps so that the sealing unit has an outer side thinner than an inner side in thickness. The present invention is advantageous in that the manufacture process can be simplified, the water-resistance and sealing property of sealing portions can be further improved, and the manufacture costs can be reduced.

4 Claims, 4 Drawing Sheets

[FIG. 1] (Conventional Art)
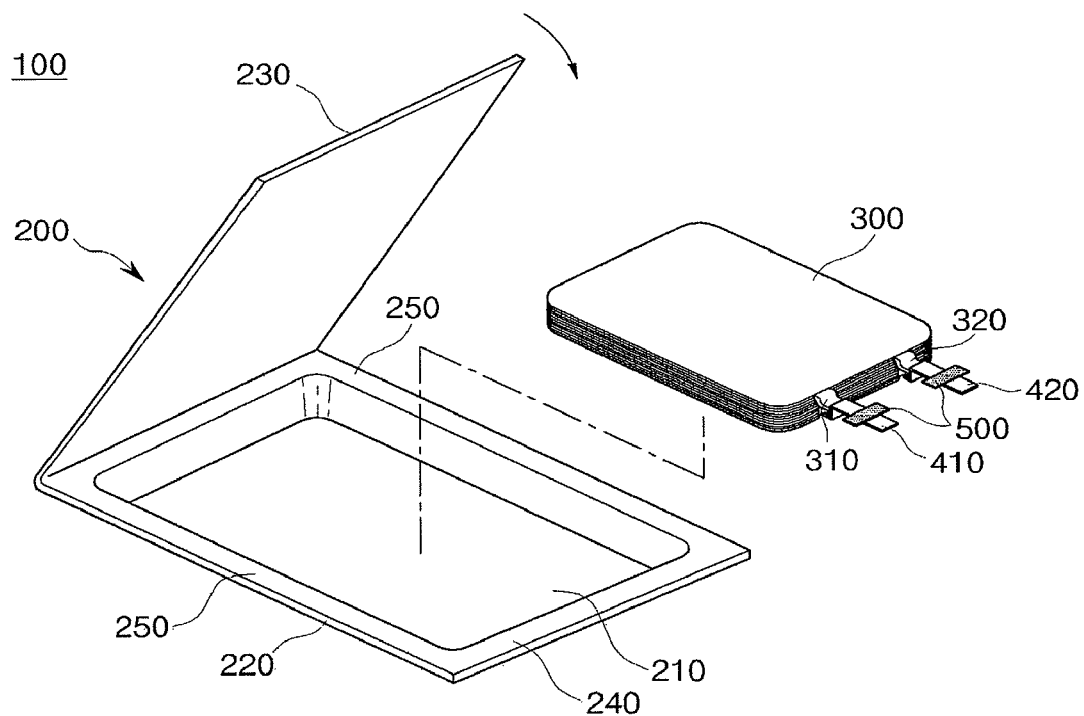
[FIG. 2] (Conventional Art)
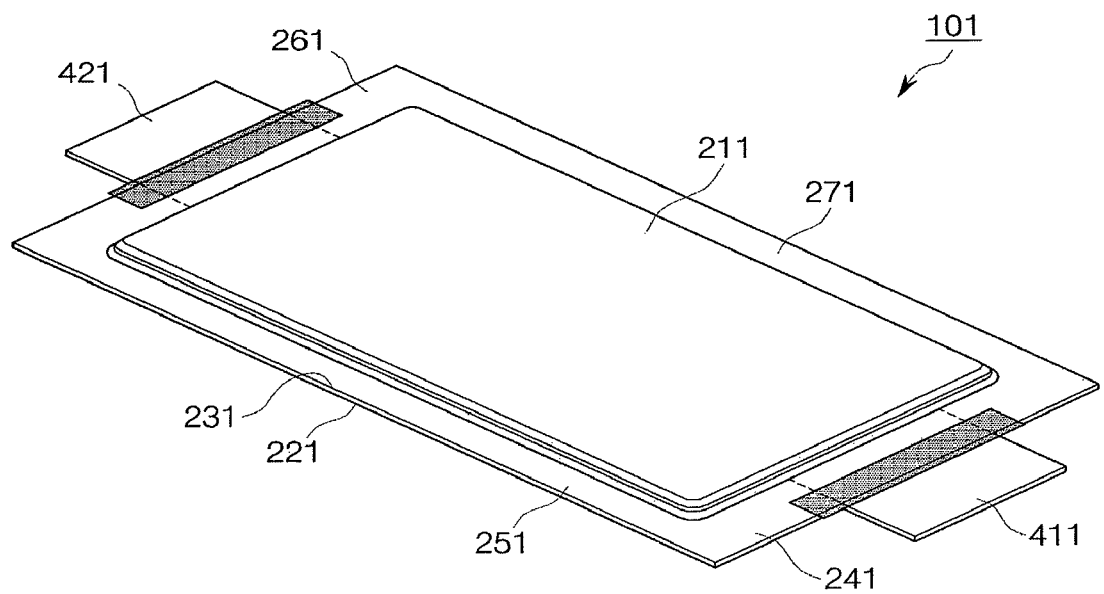

[FIG. 3] (Conventional Art)
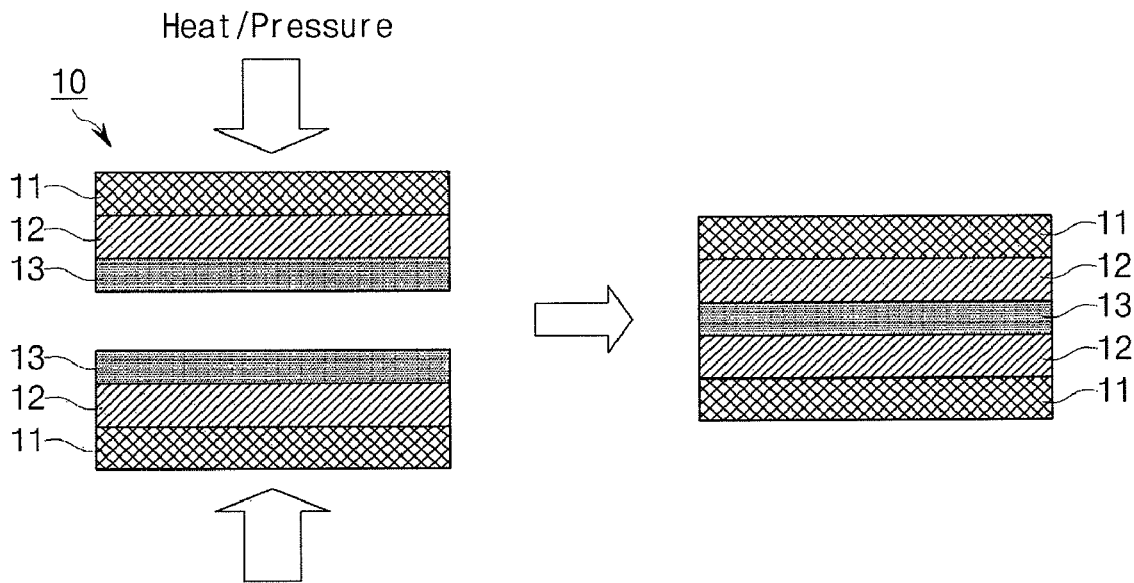
[FIG. 4]
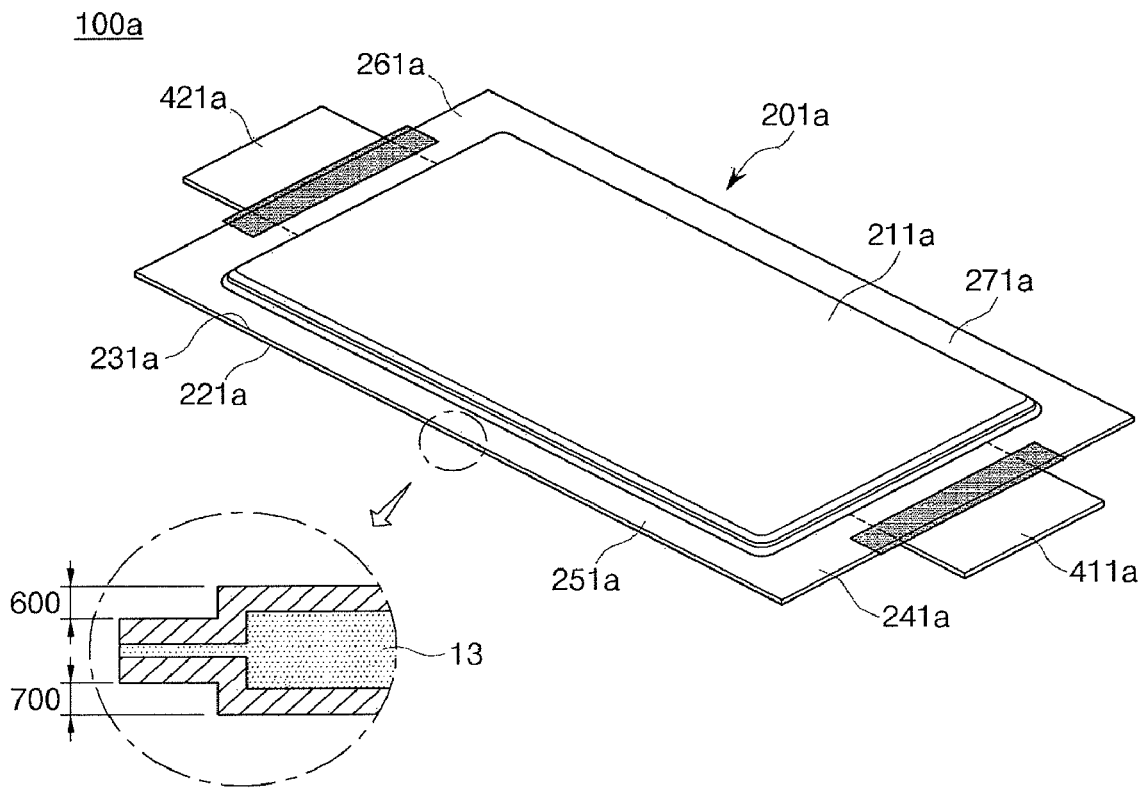

[FIG. 5]
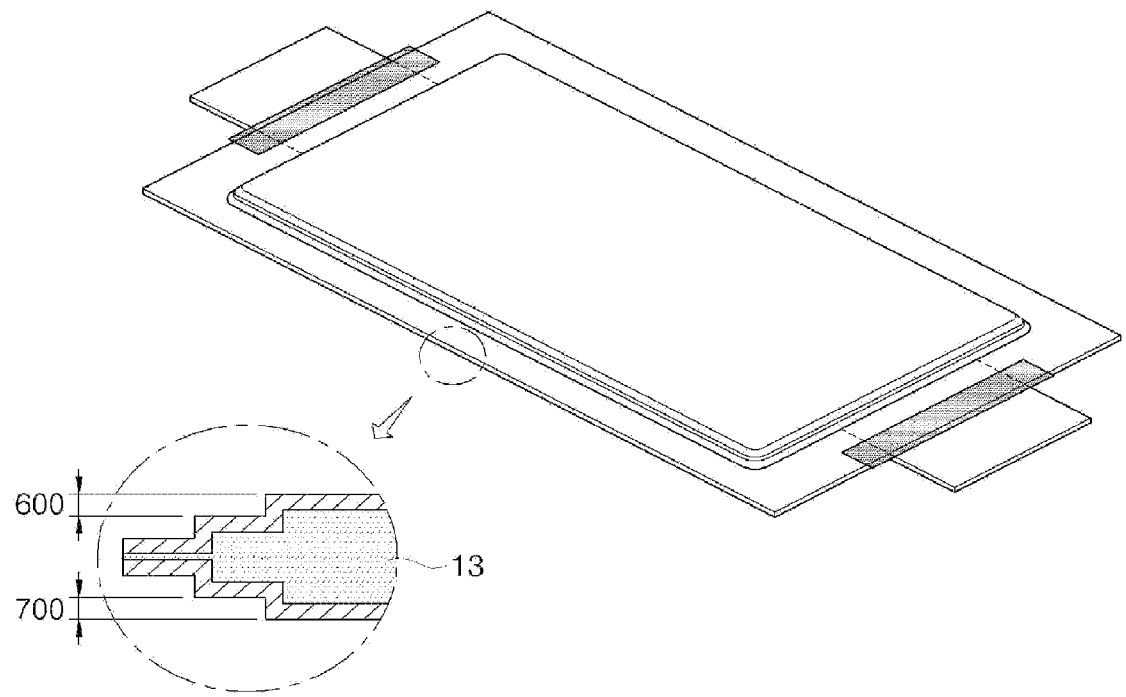
[FIG. 6]
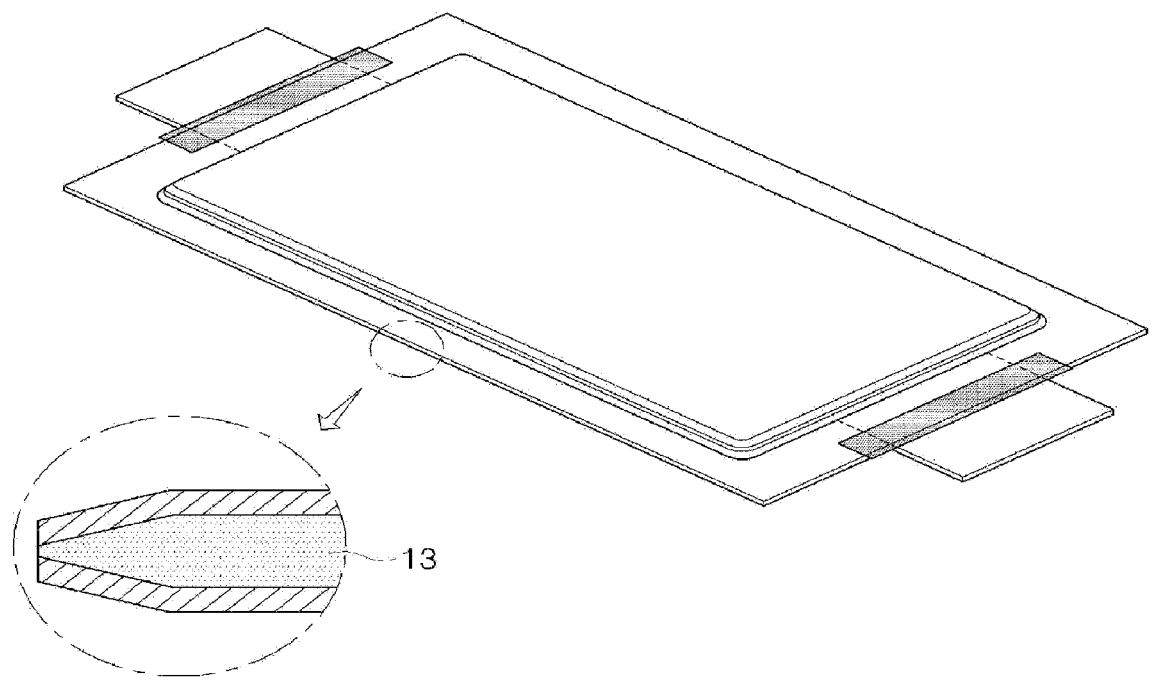

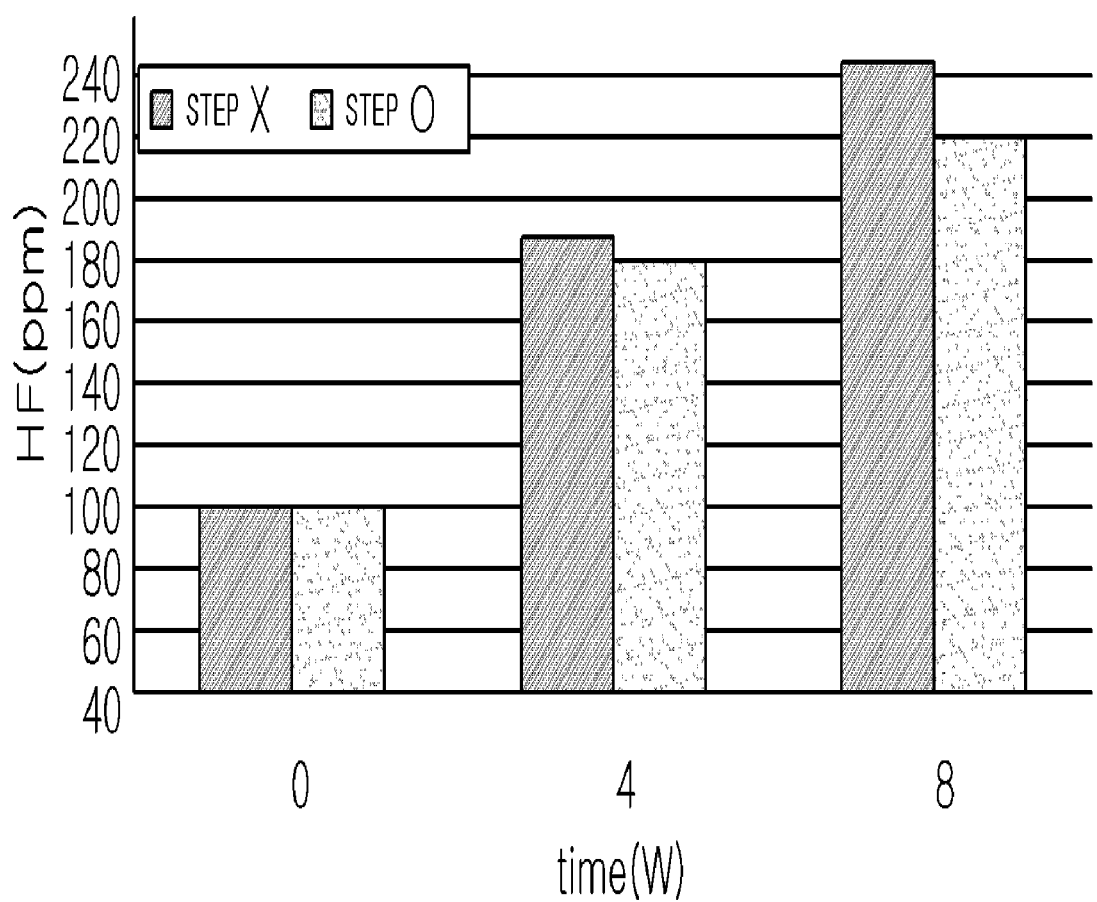
[FIG. 7]

WATER-RESISTANT POUCH TYPE SECONDARY CELL

This application is a continuation of PCT International Application No. PCT/KR2010/003230 filed on May 24, 2010, which claims the benefit of patent application Ser. No. 10-2009-0044318 filed in Korea, on May 21, 2009. The entire contents of all of the above applications are hereby incorporated by reference into the present application.

BACKGROUND OF THE INVENTION

1. Field of the Invention

The present invention relates to a pouch type secondary cell with high water-resistance.

2. Discussion of the Related Art

A secondary cell has a structure in which the electrode assembly of a positive electrode, a separation layer, and a negative electrode which can be charged or discharged is embedded in the casing of a laminate sheet, including a metal can or a resin layer and a metal layer, such as a cylinder type or an angular type, with an electrolyte impregnated therein. The electrode assembly can be classified depending on its structure. The electrode assembly can include, for example, a cylinder type (i.e., a take-up type) to Jelly-roll type electrode assembly, a stack type electrode assembly in which a number of positive electrodes and negative electrodes cut in a specific size unit are sequentially stacked with a separation layer interposed therebetween, a stack/folding type electrode assembly in which bi-cells or full cells, each having positive electrodes and negative electrodes of a specific unit stacked therein with a separation layer interposed therebetween, are taken up, etc.

From among the cell structures, the cylinder type cell structure is advantageous in that it is excellent in the structural stability, and the cell structure using the laminate sheet casing are advantageous in that it is light in weight and can be easily manufactured. Recently, the use of the cell using the laminate sheet is increased suddenly in accordance with a tendency toward the downsizing, light weight, and thinness of electrons devices and a need for a reduction in the weight of medium and large-sized cell packs. The cell using the laminate sheet is frequently called a pouch type secondary cell because of the shape of a casing.

FIG. 1 is a dismantled perspective view which is pertinent to the manufacture of one secondary cell using a laminate sheet as a cell casing (hereinafter referred to as a 'pouch type secondary cell').

Referring to FIG. 1, the pouch type secondary cell 100 is manufactured by mounting an electrode assembly 300, formed of a positive electrode, a separation layer, and a negative electrode, on a pouch type cell casing 200 formed of a laminate sheet made of polymer resin and aluminum (Al) and then coupling electrode leads 410 and 420 to the cell casing 200 with them exposed at the top of the cell casing 200.

The cell casing 200 includes an upper cover 230 and a lower casing 220 having a reception unit 210 formed therein. The cell casing 200 has a folder type structure having a bottom integrated.

In the state in which the electrode assembly 300 is seated in the reception unit 210, the top surface 240 of the lower casing 220 and the outer circumferential surfaces 250 on both sides of the lower casing 220 are adhered to the contact surface of the upper cover 230 and sealed together. Accordingly, after the cell is assembled, the top surface 240 of the lower casing 220 and the outer circumferential surfaces 250 on both sides of the lower casing 220 form a sealing unit.

Electrode tabs 310 and 320 protruded from the electrode assembly 300 are connected to the respective electrode leads 410 and 420. Sealing films 500 are connected to respective portions where the cell casing 200 and the electrode leads 410 and 420 are connected to each other. The sealing films 500 function to prevent the leakage of an electrolyte, prevent moisture in air from infiltrating the cell, and guarantee the electrical insulating property of the electrode leads 410 and 420.

FIG. 2 shows an example of another pouch type secondary cell and it is a perspective view showing the pouch type secondary cell in which electrode leads are respectively protruded from the top and bottom of a cell casing.

The pouch type secondary cell 101 of FIG. 2 differs from the pouch type secondary cell 100 of FIG. 1 in that the electrode leads 411 and 421 are respectively disposed at the top and bottom of the cell casing and the cell casing is separated into a lower casing 221 and an upper casing 231. Accordingly, the cell casing consists of the upper sealing unit 241, the lower sealing unit 261, and the sealing units 251 and 271 on both sides which are formed by thermally compressing the lower casing 221 and the upper casing 231. A reception unit 211 can be formed only in the upper casing 231 or the lower casing 221 or can be formed in both the lower and upper casings 221 and 231.

FIG. 3 shows a process of forming the sealing unit of a laminate sheet which is commonly used as a cell casing in a pouch type secondary cell and shows a cross section of the coupled laminate sheet.

Referring to FIG. 3, the laminate sheet 10 includes an external resin layer 11 forming the outermost part, a metal layer 12 preventing the penetration of materials, and an internal resin layer 13 performing a sealing function.

The external resin layer 11 functions to protect the cell from the outside and so requires the thickness versus an excellent tension strength, atmosphere corrosion resistance, etc. The external resin layer 11 is commonly made of flexible nylon. The metal layer 12 functions to prevent air, moisture, etc. from being introduced into the cell and it is commonly made of aluminum (Al). The internal resin layer 13 is thermally compressed by heat and pressure applied in the state in which an electrode assembly is built in the cell casing, thus providing a sealing property. The internal resin layer 13 is commonly made of cast polypropylene (CPP).

The cell casing sheet 10 of the multi-layer laminate structure is configured to have the internal resin layers 13 facing each other in the sealing unit. The internal resin layers 13 are coupled together by thermal compression. In this case, the internal resin layer 13 is exposed externally at a portion where the laminate sheets are coupled together. Moisture can easily penetrate into the exposed internal resin layer 13 because it is commonly made of polymer resin. The penetrated moisture has bad problems in terms of cell safety, such as that generates a side reaction within the cell, reduces the life span of the cell, oxidizes the metal layer 12 of the cell casing, weakens the adhesion strength of the sealing unit, and possibly leaks the electrolyte. Further, if the cell is used for a long time, the penetrated moisture reduces the life span and safety of the cell. Accordingly, various attempts to prevent the penetration of moisture and the leakage of the electrolyte had been made.

For example, Japanese Unexamined Patent Application Publication No. 2004-087239 discloses a laminate sheet in which an internal resin layer is coated with metal layers by shaping lateral portions where laminate films are adhered together through thermal pressurization and compression so that the metal layers (i.e., shut-off metal layers) are brought into contact with each other.

In the above technique, however, the metal layers are simply brought into contact with each other through thermal pressurization and compression. Accordingly, the above technique is problematic in that sufficient water-resistance cannot be obtained because the coupling of the metal layers is not robust and the metal layers are separated from each other because the coupling of the metal layers is weakened because of a long-term use.

Japanese Unexamined Patent Application Publication No. 2004-055154 discloses a technique for preventing the leakage of an electrolyte and the penetration of moisture resulting from the exposure of an inner resin layer by extending the peripheral portion of one of a pair of laminate films more outward than the peripheral portion of the other of the pair of laminate films and performing laser welding on a portion with which the front end of the extended portion, bent toward the peripheral portion of one of the pair of laminate films, is brought into contact so that the outermost layer is volatilized by the heat of the laser light and the ends of both metal layers are melted and combined together.

However, the above method is problematic in that it requires a high degree of accuracy in terms of the process because one of the pair of laminate films must be accurately bent enough to seal the other of the pair of laminate films and the cell manufacture costs are increased because the process is added.

Further, Japanese Unexamined Patent Application Publication No. 2000-223090 discloses a technique in which a metal layer and a thermal compression layer are stacked, part of a thermally compressed portion toward the inside of a cell casing is removed to expose the metal layer, and dual sealing processing, including the thermal compression of the thermal compression layer and the welding of the metal layer, is performed when a cell is sealed.

However, the above method is problematic in that the process is complicated and the costs are increased because the dual sealing processing is performed.

SUMMARY OF THE INVENTION

Accordingly, the present invention has been made keeping in mind the above problems occurring in the prior art.

The inventors of this application have found that after various experiments and deep researches, if steps are formed at the tips of the outer sides of sealing units, a phenomenon in which materials within a cell are eroded by a side reaction within the cell resulting from the penetration of moisture can be fundamentally prevented and so the life span and stability of the cell can be improved.

In accordance with an aspect of the present invention, there is provided a pouch type secondary cell, comprising a positive electrode, a separation layer, and a negative electrode. Here, the sealing unit of the secondary cell includes steps so that the sealing unit has an outer side thinner than an inner side in thickness.

In the pouch type secondary cell of the present invention, each of the steps comprises one or more steps discontinuously formed from the inner side to the outer side. In the pouch type secondary cell of the present invention, each of the steps is continuously formed from the inner side to the outer side.

In the pouch type secondary cell of the present invention, a thickness of an outermost internal resin layer of the sealing unit is 3 to 50% of a thickness of the internal resin layer not thermally compressed.

In the pouch type secondary cell of the present invention, a thickness of an innermost internal resin layer of the sealing unit is 50 to 95% of a thickness of the internal resin layer not thermally compressed.

In the pouch type secondary cell of the present invention, the sealing unit has a width ranging from 3 to 20 mm.

BRIEF DESCRIPTION OF THE DRAWINGS

The above and other objects and features of the present invention will become apparent from the following description of preferred embodiments given in conjunction with the accompanying drawings, in which:

FIGS. 1 and 2 are perspective views showing the structure of a conventional pouch type secondary cell;

FIG. 3 is a diagram showing a process of forming the sealing unit of a laminate sheet which is commonly used in a pouch type secondary cell;

FIGS. 4 to 6 are perspective views an embodiment of the present invention; and

FIG. 7 is a graph showing a comparison of the time and the amount of generated hydrogen fluoride (HF) in the case in which steps are formed in sealing units and in the case in which the steps are not formed in the sealing units.

DETAILED DESCRIPTION OF THE EMBODIMENTS

Hereinafter, some embodiments of the present invention will be described in detail with reference to the accompanying drawings so that it can be readily implemented by those skilled in the art.

The present invention relates to a pouch type secondary cell, including a positive electrode, a separation layer, and a negative electrode, wherein the sealing unit of the secondary cell includes steps so that the sealing unit has an outer side thinner than an inner side in thickness.

In other words, in accordance with the present invention, in the pouch type secondary cell manufactured by receiving the electrode assembly of the positive electrode, the separation layer, and the negative electrode in a pouch type cell casing and sealing the cell casing using thermal compression, sealing units sealed by the thermal compression sealing has an outer side which is thinner than an inner side in thickness.

The term "outer side" refers to a place or portion relatively far from the reception unit of the electrode assembly placed at the center of the cell casing, and the term "inner side" refers to a place or portion relatively close to the reception unit of the electrode assembly placed at the center of the cell casing.

As can be seen from Equation 1 below, the amount of moisture penetrated through the sealing units is proportional to the cross section (L*T) of an internal resin layer which brings into contact with the outside. In the present invention, the steps are formed in the sealing units, and the outer side of the step is thinner than the inner side thereof in the thickness of the internal resin layer in order to enhance water-resistance.

$$\text{Mass transfer rate} = D^* \Delta C / W^* L^* T \qquad \text{equation 1}$$

where D is a diffusion coefficient, ΔC is a difference in the concentration, W is a position, L is the width of the cross section of the internal resin layer, and T is the height (thickness) of the cross section of the internal resin layer.

That is, in the present invention, the steps allow the internal resin layer of a laminate sheet to be externally exposed to the minimum extent, thereby enhancing the water-resistance and the sealing property of the cell. The internal resin layer is exposed at a portion where the laminate sheets are combined together. The exposed internal resin layer is chiefly made of polymer resin, and so moisture can easily penetrate into the exposed internal resin layer. The penetrated moisture generates bad problems in terms of cell safety, such as that oxidizes materials within the cell and the metal layer of the cell casing, weakens the adhesion strength of the sealing units, and possibly leaks an electrolyte and also causes to reduce the life span and stability of the cell when the cell is used for a long time. In the case in which $LiPF_6$ lithium salt is included in the electrolyte, $LiPF_6$ must exist in the form of ions of $Li^+$ and $PF_6^-$. However, unstable $PF_5$ is created as byproducts because of an unwanted side reaction. The created unstable $PF_5$ reacts to $H_2O$, thereby forming hydrogen fluoride (HF). The formed HF breaks a SEI layer and causes to dissolve the positive electrode. This phenomenon is more remarkable at high temperature.

Accordingly, the internal resin layer can be formed to have a thin thickness in order to enhance water-resistance. However, to form the internal resin layer having a thin thickness unconditionally is not preferred. With a reduction in the thickness of the internal resin layer, the internal electrolyte is likely to leak externally and a contact can occur between the metal layers or between the metal layer and the electrolyte. Accordingly, the insulating property of the cell is much deteriorated.

Accordingly, in the present invention, to solve the above problems, the steps each having the inner side and the outer side with a different thickness are formed. In other words, the outer side of the step has a relatively thin thickness in order to enhance water-resistance, and the inner side of the step has a relatively thick thickness in order to guarantee the insulating property and the sealing property of the cell. In the present invention, the step can be formed in various ways.

The outer side of the sealing unit can be formed under a relatively higher sealing pressure than the inner side of the sealing unit. In accordance with an embodiment of the present invention, a method of forming the laminate sheet through thermal compression using a roller having a step formed therein or a method of forming the laminate sheet through thermal compression using a bar having a step formed therein can be used (that is, the step can be easily formed simultaneously with the sealing of the cell casing by thermally compressing the laminate sheet using the roller or bar having the same shape as a step to be formed).

As shown in FIGS. 4 to 6, the step of the cell casing may be formed to have one discontinuous step from the inner side to the outer side, but may be formed to have one or more discontinuous steps. Alternatively, the step may be continuously formed from the inner side to the outer side.

In the present invention, the step has the inner side thinner than the outer side in thickness. Accordingly, a difference between the high and the low has only to exist as shown in FIGS. 4 to 6, the shape of the step is not limited.

In the present invention, the thickness of the sealing unit pertinent to the step is not specially limited, and the thickness of the outermost internal resin layer of the sealing unit preferably is 3 to 50% of the thickness of the internal resin layer that has not been thermally compressed. If the thickness of the outermost internal resin layer of the sealing unit exceeds 50% of the thickness of the internal resin layer that has not been thermally compressed, water-resistance becomes poor. If the thickness of the outermost internal resin layer of the sealing unit is less than 3% of the thickness of the internal resin layer that has not been thermally compressed, the insulating property of a cell may not be good because the metal layers of the laminate sheet are brought into contact with each other.

Further, the thickness of the innermost internal resin layer of the sealing unit preferably is 50 to 95% of the thickness of the internal resin layer that has not been thermally compressed. If the thickness of the innermost internal resin layer of the sealing unit is less than 50% of the thickness of the internal resin layer that has not been thermally compressed, it is difficult to prevent the leakage of an electrolyte and the insulating property of a cell is poor. If the thickness of the innermost internal resin layer of the sealing unit exceeds 95% of the thickness of the internal resin layer that has not been thermally compressed, the sealing property can be deteriorated.

In general, the internal resin layer before the laminate sheet used as the cell casing is subject to thermal compression has a thickness of 0.5 to 50 μm.

The width of the sealing unit is not specially limited, but preferably in the range of 3 to 20 mm.

Further, the present invention provides a method of manufacturing the pouch type secondary cell, including the steps of forming the electrode assembly by alternately and sequentially stacking the positive electrode, the separation layer, and the negative electrode; receiving the electrode assembly in the pouch type cell casing; and forming the sealing units in the cell casing by thermally compressing the cell casing. Here, when the cell casing is thermally compressed, the steps are formed in the respective sealing units having the outer side thinner than the inner side in thickness.

In the method of manufacturing the pouch type secondary cell according to the present invention, the sealing unit can be formed using a method of thermally compressing the laminate sheet using a roller having a step formed therein or a method of thermally compressing the laminate sheet using a bar having a step formed therein (that is, the step can be easily formed simultaneously with the sealing of the cell casing by thermally compressing the laminate sheet using the roller or bar having the same shape as a step to be formed). Further, the outer side of the sealing unit can be sealed and formed using a relatively higher sealing pressure than the inner side of the sealing unit.

Hereinafter, an embodiment of the present invention is further described with reference to the accompanying drawings, but the scope of the present invention is not limited thereto.

FIG. 4 is a diagram showing the pouch type secondary cell in which the steps are formed in the sealing units according to an embodiment of the present invention.

Referring to FIG. 4, the pouch type secondary cell 100a has a structure in which electrode leads 411a and 421a are symmetrically formed on the upper and lower sides of a cell casing 201a, respectively. The pouch type secondary cell 100a is manufactured through thermal compression using a roller having a step formed therein in the state in which an upper casing 231a and a lower casing 221a separated from each other are embedded in an electrode assembly (not shown). Here, the steps are formed at the tips of the sealing units. The steps 600 and 700 are formed up and down in upper and lower sealing units 241a and 261a and sealing units 251a and 271a on both sides of the cell casing which are formed through thermal compression.

When the steps are formed at the tips of the sealing units as described above, the area in which the internal resin layer 13 is exposed externally can be reduced. Further, part of the internal resin layer 13 not exposed externally can be formed thickly.

FIGS. 5 and 6 are diagrams showing the shapes of steps according to another embodiment of the present invention. In the embodiments of the present invention, the steps can include two or more discontinuous steps, as shown in FIG. 5, or can include numerous continuous steps, as shown in FIG. 6.

From FIG. 7, it can be seen that in the present invention in which the steps are formed in the sealing units, water-resistance is enhanced and the amount of hydrogen fluoride (HF) generated within the cell according to a lapse of the time is further reduced, as compared with a case in which the steps are not formed in the sealing units.

As described above, the present invention is advantageous in that the manufacture process can be simplified, the water-resistance and sealing property of sealing portions can be further improved, and the manufacture costs can be reduced.

While the invention has been shown and described with respect to the preferred embodiments, it will be understood by those skilled in the art that various changes and modifications may be made without departing from the spirit and scope of the invention as defined in the following claims.

What is claimed is:

1. A pouch type secondary cell, comprising a positive electrode, a separation layer, and a negative electrode, wherein a sealing unit of the secondary cell includes steps so that the sealing unit has an outer side thinner than an inner side in thickness, and wherein the sealing unit of the secondary cell includes a plurality of substantially right angled discontinuous steps.

2. The pouch type secondary cell of claim 1, wherein a thickness of an outermost internal resin layer of the sealing unit is 3 to 50% of a thickness of the internal resin layer not thermally compressed.

3. The pouch type secondary cell of claim 1, wherein a thickness of an innermost internal resin layer of the sealing unit is 50 to 95% of a thickness of the internal resin layer not thermally compressed.

4. The pouch type secondary cell of claim 1, wherein the sealing unit has a width ranging from 3 to 20 mm.

* * * * *